(12) United States Patent
Abadi et al.

(10) Patent No.: US 11,288,063 B2
(45) Date of Patent: Mar. 29, 2022

(54) METHOD AND APPARATUS FOR ASSISTING IN OPEN SOURCE USAGE

(71) Applicant: WHITESOURCE LTD., Givatayim (IL)

(72) Inventors: Aharon Abadi, Givatayim (IL); Doron Cohen, Givatayim (IL); Rami Sass, Givatayim (IL)

(73) Assignee: WHITESOURCE LTD., Givatayim (IL)

( * ) Notice: Subject to any disclaimer, the term of this patent is extended or adjusted under 35 U.S.C. 154(b) by 100 days.

(21) Appl. No.: 16/658,097

(22) Filed: Oct. 20, 2019

(65) Prior Publication Data

US 2021/0117185 A1    Apr. 22, 2021

(51) Int. Cl.
*G06F 9/44* (2018.01)
*G06F 8/73* (2018.01)
*G06F 8/36* (2018.01)

(52) U.S. Cl.
CPC . *G06F 8/73* (2013.01); *G06F 8/36* (2013.01)

(58) Field of Classification Search
None
See application file for complete search history.

(56) References Cited

U.S. PATENT DOCUMENTS

| | | | | |
|---|---|---|---|---|
| 2007/0168946 A1* | 7/2007 | Drissi | | G06F 8/71 717/110 |
| 2010/0106705 A1* | 4/2010 | Rush | | G06F 8/36 707/709 |
| 2012/0254835 A1* | 10/2012 | Muddu | | G06F 8/75 717/121 |
| 2015/0046492 A1* | 2/2015 | Balachandran | | G06F 8/36 707/772 |
| 2016/0026439 A1* | 1/2016 | Zaydman | | G06F 8/33 717/113 |
| 2016/0063062 A1* | 3/2016 | Yahav | | G06F 8/75 707/769 |
| 2017/0371629 A1* | 12/2017 | Chacko | | G06F 8/35 |
| 2018/0081881 A1* | 3/2018 | Poddar | | G06F 16/24578 |
| 2018/0373507 A1* | 12/2018 | Mizrahi | | G06N 7/00 |
| 2019/0303141 A1* | 10/2019 | Li | | G06F 16/9038 |
| 2020/0097261 A1* | 3/2020 | Smith | | G06N 3/0454 |
| 2020/0117446 A1* | 4/2020 | Smith | | G06N 3/0445 |
| 2020/0125482 A1* | 4/2020 | Smith | | G06F 8/427 |
| 2020/0167134 A1* | 5/2020 | Dey | | G06F 9/453 |
| 2020/0293291 A1* | 9/2020 | Guan | | G06F 8/72 |
| 2020/0326913 A1* | 10/2020 | Ying | | G06F 8/74 |
| 2021/0081182 A1* | 3/2021 | Seshadri | | G06F 8/36 |

\* cited by examiner

*Primary Examiner* — Insun Kang
(74) *Attorney, Agent, or Firm* — The Ross Gross Law Firm, LLC; Roy Gross

(57) ABSTRACT

A method, apparatus and computer program product, the method comprising: accessing user computer code; automatically extracting a slice from the user computer code indicating usage or usage attempt of source code, the slice comprising a multiplicity of words; subject to a word from the multiplicity of words being combined of at least two words, splitting the word to the at least two words; issuing a query based on at least some of the multiplicity of words and the at least two words, to a source and document database; and receiving in response to the query, at least one source section or document related to usage of the source code.

20 Claims, 2 Drawing Sheets

METHOD AND APPARATUS FOR ASSISTING IN OPEN SOURCE USAGE

TECHNICAL FIELD OF THE INVENTION

Figure 1:
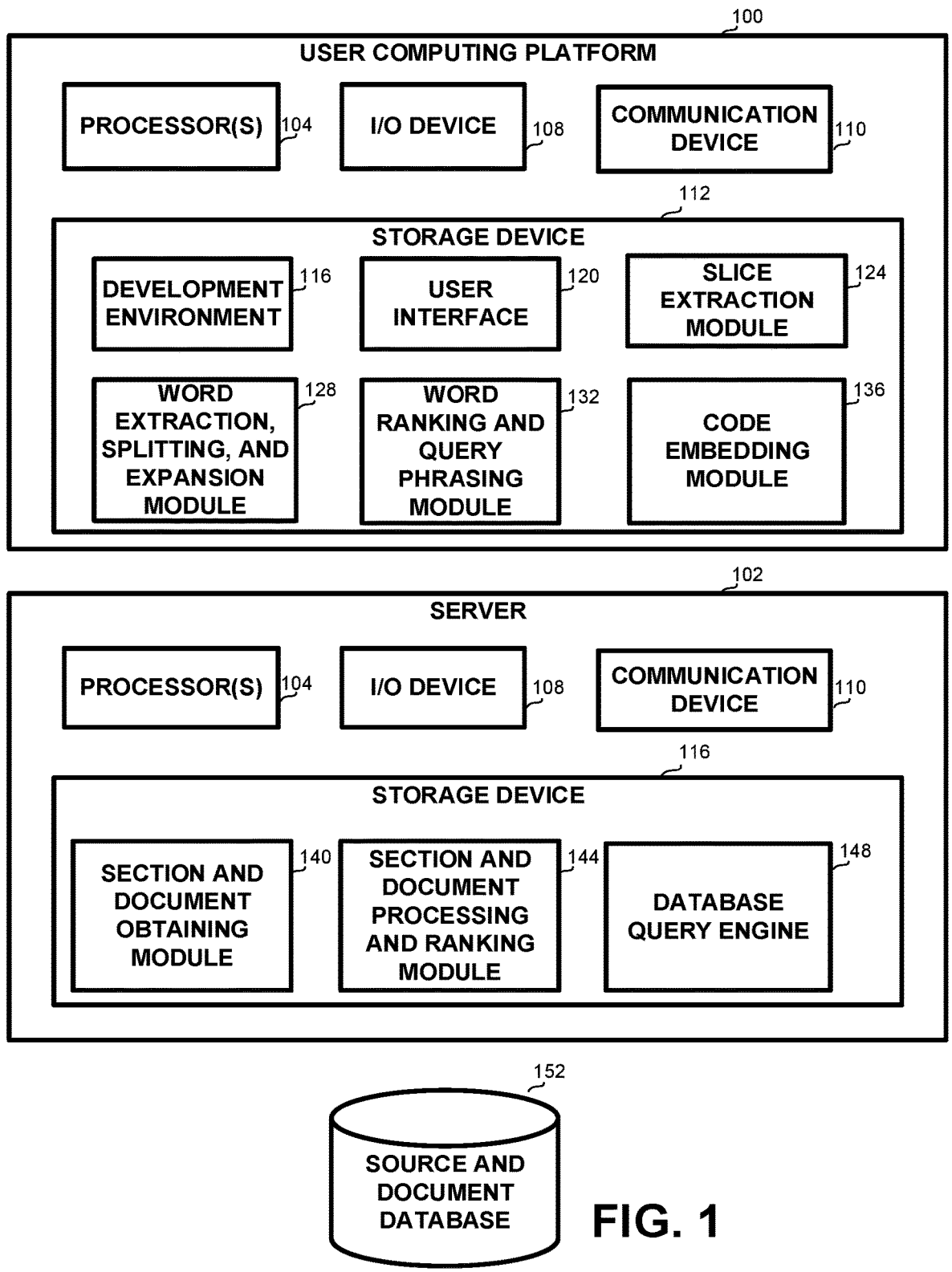

The present disclosure relates to open source in general, and to an apparatus and method for assisting a programmer in using open source, in particular.

BACKGROUND OF THE INVENTION

Open source relates to computer source code that is publicly available and may be freely accessed and used by programmers in developing code. Open source may be provided as binary files or libraries to be linked with a user's' project, as code files to be compiled with a user's project, as code snippets to be added and optionally edited by a user as part of a file, as any other format, or in any combination thereof.

Open source may be used for a multiplicity of reasons, such as but not limited to: saving programming and debugging time and effort by obtaining a functional verified unit; porting or programming code to an environment in which the user has insufficient experience or knowledge; adding generic options such as graphic support, printing, or the like, or other purposes. The ease of obtaining such code on the Internet has greatly increased the popularity of its usage.

Despite the many advantages, source code may sometime not be trivial to use. In some situations, substantial amount of code needs to be written in order to use functions or others units of an open source library, including for example defining variables, assigning values to variables, activating preparatory functions of the open source, parsing the results returned by the open source, or the like. Thus, a user may spend substantial amount of time, and may experience significant difficulties in using open source code or library.

BRIEF SUMMARY OF THE INVENTION

One exemplary embodiment of the disclosed subject matter is a computer-implemented method comprising: accessing user computer code; automatically extracting a slice from the user computer code indicating usage or usage attempt of source code, the slice comprising a multiplicity of words; subject to a word from the multiplicity of words being combined of two or more words, splitting the word to the at two or more words; issuing a query based on at least some of the multiplicity of words and the at least two words, to a source and document database; and receiving in response to the query, one or more source sections or documents related to usage of the source code. Within the method, one of the source sections optionally comprises open source code. Within the method, one of the source sections or documents optionally comprises a source code, and the method can further comprise embedding the source code within the user computer code. The method can further comprise: presenting to a user a list of the source sections or documents; and receiving a user selection of a source section or a document. The method can further comprise: assigning a match rank to each source sections or documents received, the match rank indicting a match between the source section or document and the query; and selecting a source section or document in accordance with the match rank. The method can further comprise preparing the source and document database, said preparing comprising: accessing a collection of documents comprising source code; for at least one document in the collection of documents: extracting a section from the at least one document; assigning a rank to the section; and storing the section or the document and the rank in the source and document database. Within the method, the section or document is optionally stored in association with a title. The method can further comprise preprocessing the document. The method can further comprise: extracting words from the slice to create a word collection; expanding the word collection with one or more words; and phrasing the query based on the word collection. The method can further comprise: assigning a word rank to a word from the word collection, wherein the at least one source section or document is retrieved in accordance with the word rank.

Another exemplary embodiment of the disclosed subject matter is a computerized apparatus having a processor, the processor being adapted to perform the steps of: accessing user computer code; automatically extracting a slice from the user computer code indicating usage or usage attempt of source code, the slice comprising a multiplicity of words; subject to a word from the multiplicity of words being combined of at least two words, splitting the word to the two or more words; issuing a query based on at least some of the multiplicity of words and the two or more words, to a source and document database; and receiving in response to the query, one or more source sections or documents related to usage of the source code. Within the apparatus, one or more of the source sections optionally comprises open source code. Within the apparatus, one of the source sections or documents optionally comprises code source, and wherein the processor is further configured to embed the code source within the user computer code. Within the apparatus, the processor is optionally further configured to: present to a user a list of the source sections or documents; and receive a user selection of a section or a document. Within the apparatus, the processor is optionally further configured to: assign a match rank to one of the source sections or documents received, the match rank indicting a match between the source section or document and the query; and select a section or document in accordance with the match rank. Within the apparatus, the processor is optionally further configured to prepare the source and document database, comprising: accessing a collection of documents comprising source code; for a document in the collection of documents: extracting a section from the document; assigning a rank to the section; and storing the section or the document and the rank in the source and document database. Within the apparatus, the processor is optionally further configured to preprocess the section or document. Within the apparatus, the processor is optionally further configured to: extract words from the slice to create a word collection; expand the word collection with one or more words; and phrase the query based on the word collection. Within the apparatus, the processor is optionally further configured to assign a word rank to a word from the word collection, wherein the source sections or documents are retrieved in accordance with the word rank.

Yet another exemplary embodiment of the disclosed subject matter is a computer program product comprising a computer readable storage medium retaining program instructions, which program instructions when read by a processor, cause the processor to perform a method comprising: accessing user computer code; automatically extracting a slice from the user computer code indicating usage or usage attempt of source code, the slice comprising a multiplicity of words; subject to a word from the multiplicity of words being combined of two or more words, splitting the word to the two or more; issuing a query based on at least some of the multiplicity of words and the two or more words, to a source and document database; and receiving in response to the query, one or more source sections or documents related to usage of the source code.

THE BRIEF DESCRIPTION OF THE SEVERAL VIEWS OF THE DRAWINGS

Figure 2:
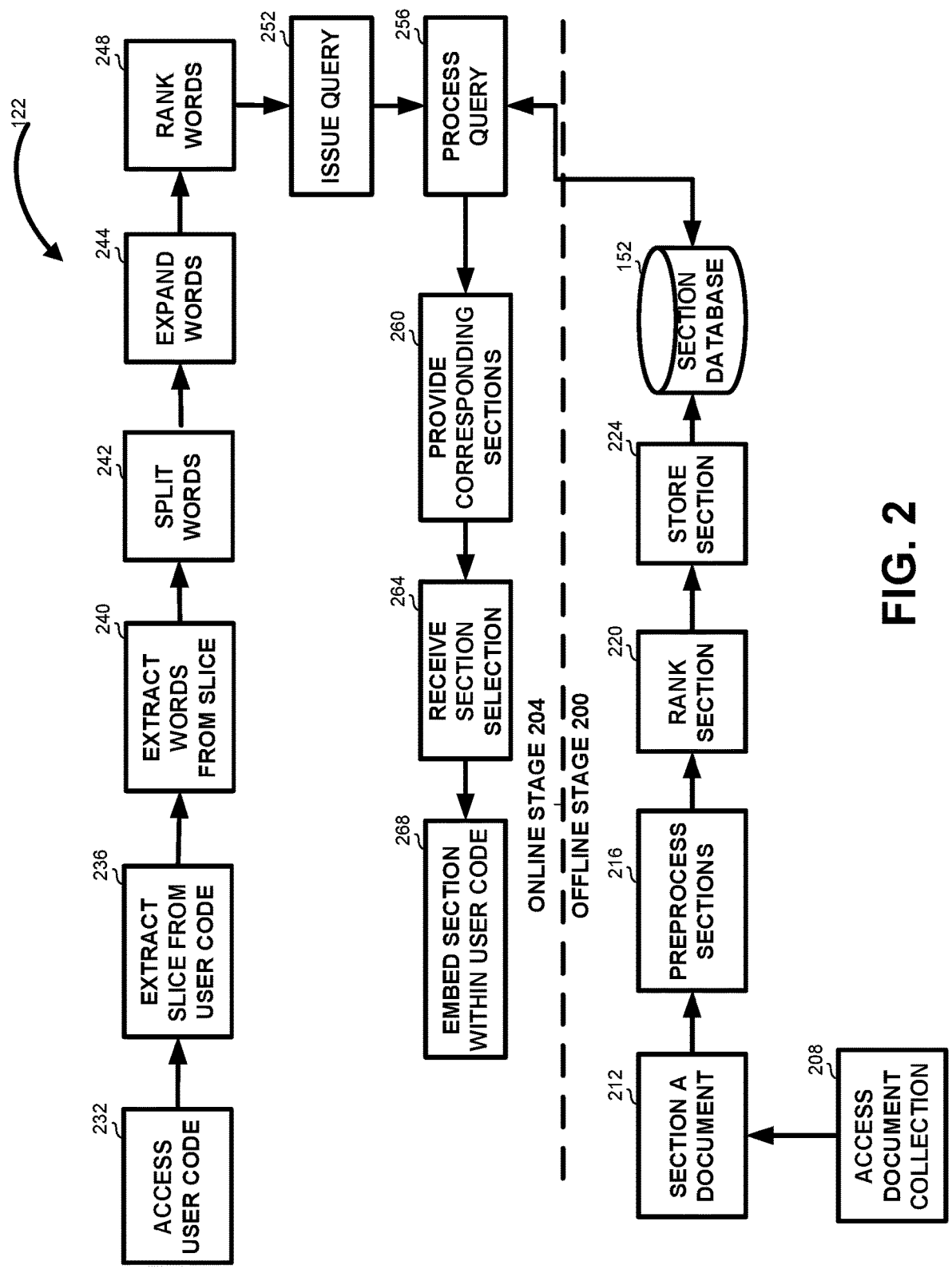

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a block diagram of an apparatus for assisting a user in using open source and other materials, in accordance with some exemplary embodiments of the subject matter; and FIG. 2 shows a flowchart of steps in a method for assisting a user in using open source and other materials, in accordance with some exemplary embodiments of the subject matter.

DETAILED DESCRIPTION OF THE INVENTION

One technical problem dealt with by the disclosed subject matter is the need to assist users such as programmers in using open source. Many open source projects are not trivial to use, and a user is required to write non-trivial code and/or significant amount of code, in order to properly use the open source and obtain the intended results. Such code, referred to as auxiliary code, in addition to requiring significant time and/or knowledge which may not always be readily available. Further, such code may also introduce bugs or other undesired effects, such as memory leaks, excess runtime or the like.

One technical solution comprises a method and apparatus for automatically identifying that a user is writing code that uses or is intended to use open source, and assisting the user in writing the code. When a slice of the user's code which relates to using open source is identified, a query may be constructed based on the code, for example by extracting words from the code and ranking the words. The query is provided to an open source usage database, which may comprise code sections, each code section comprising code that uses open source and optionally also an appropriate title. The database may also comprise meta data, documents, examples, discussion texts, or the like. The user may then be presented with a response returned from the database, which may comprise code sections corresponding to the query, and hence to the user's code slice. Each returned code section may comprise code that uses the open source library the user is trying to use, and optionally a rank associated with a match between the query and the code section. The user may select one of the code sections, and the selected code section may be embedded within the user code. In other embodiments, one of the code sections is selected automatically and embedded within the user's code. Optionally, embedding may include adapting the code section to the user's code, comprising for example changing variable names. In some situations the query may return a document other than source code, which the user may use for learning, embedding in other documents, or the like.

Another technical solution comprises building the source and document database, by accessing a multiplicity of sources of computer code, such as web pages, documents, programmer forums or the like. Each such source may have a title indicating the open source being used or referred to, and optionally one or more code sections using the open source. Each document or code section may be preprocessed, for example unnecessary words may be omitted, a word bag may be built, words may be assigned a rank, or the like. The document or code section, generally referred to as section, may be ranked, for example in accordance with any one or more of the following: ranks of words comprised in the section; the section's title; whether significant words appear in the title and/or in the section; whether words in the section are function names, variable names, or the like; the number of times each word appears in the section; the section length; the writer's popularity; readers' grading of the code; positive/negative comments to the section; code conciseness; or other parameters. The sections may be stored in association with the title and with the rank in a database, such that the database can be searched according to queries related to various open sources used by users.

One technical effect of utilizing the disclosed subject matter is the assistance provided to users in using open source code, documents, libraries, or the like. Once the user indicates the source code she intends to use, for example by entering into the user's code one or more names of a package, a function, a variable or another coding entity, one or more code sections using the open source, or other documents, may be presented to the user. The code sections and documents may be ranked according to their correspondence to the user's code, their own rank, or the like. The automatic retrieval of selected code sections not only saves to the user the time and effort required for coding the auxiliary code, but may also provide for high quality user code free of bugs or other undesired effects. The assistance can be described as code completion, whereby if the user entered partial code from which the open source to be used can be deduced, the user's code may be automatically completed into useable code. If other documents are retrieved in addition to code sections or in the absence thereof, such documents may also be returned and be of help to the user.

Referring now to FIG. 1, showing a block diagram of an apparatus for assisting a user in writing code for using open source and other materials, libraries, functions or other units.

The apparatus may comprise one or more user computing platforms 100 or one or more servers 102. In some embodiments, user computing platform 100 and server 102 are remote from each other and may communicate via any communication channel such as the Internet, Intranet, Local Area Network (LAN), Wide Area Network (WAN), or the like. However in other embodiments, user computing platform 100 and server 102 may be implemented on one device, such as a server, wherein the user's computing platform may be implemented as a web page.

User computing platform 100 may comprise a processor 104. Processor 104 may be a Central Processing Unit (CPU), a microprocessor, an electronic circuit, an Integrated Circuit (IC) or the like. Processor 104 may be utilized to perform computations required by the apparatus or any of it subcomponents.

In some exemplary embodiments of the disclosed subject matter, user computing platform 100 may comprise an Input/Output (I/O) device 108 such as a display, a pointing device, a keyboard, a touch screen, or the like. I/O device 108 may be utilized to provide output to and receive input from a user.

In some exemplary embodiments of the disclosed subject matter, user computing platform 100 may comprise communication device 110 such as a network adaptor, enabling user computing platform 100 to communicate with other platforms such as server 102.

In some exemplary embodiments, user computing platform 100 may comprise a storage device 112. Storage device 112 may be a hard disk drive, a Flash disk, a Random Access Memory (RAM), a memory chip, or the like. In some exemplary embodiments, storage device 112 may retain program code operative to cause processor 104 to perform acts associated with any of the subcomponents of apparatus 100. The components detailed below may be implemented as one or more sets of interrelated computer instructions, executed for example by processor 104 or by another processor. The components may be arranged as one or more executable files, dynamic libraries, static libraries, methods, functions, services, or the like, programmed in any programming language and under any computing environment.

Storage device 112 may store, or be operatively in communication with another storage device storing user code (not shown), such as source code using or attempting to use open source, or other documents.

Storage device 112 may store a programming development environment 116, also referred to as Integrated Development Environment (IDE) designed for programming, compiling if required, executing and debugging program code. One or more of the modules below may be implemented as one or more components such as plug-ins for IDE 116, enabling a user to use open source more easily. Alternatively, one or more modules may be implemented as a separate executable which is invoked automatically, continuously, periodically, by the user, or in any other manner and frequency.

Storage device 112 may store user interface 120 for displaying to a user or receiving from the user various aspects associated with the disclosure, such as a query upon which code sections and documents are to be searched for, one or more retrieved code sections or documents for the user to select from, user selections, changes to be introduced to a code section to adapt to the user's code or the like.

Storage device 112 may store slice extraction module 124, for extracting one or more slices from the user's code, that contain usage or usage attempt of open source. Slices can be searched for and identified from a location in the code where a user is attempting to use external code, for example calling an API and until the end of the nearest block, function, file, unit or the like. Alternatively, the full user's code can be scanned for open source usage, and once corresponding code is detected, a slice may be extracted. The user's code can be scanned continuously, at predetermined intervals, upon user request, or the like.

Storage device 112 may store word extraction, splitting, and expansion module 128, for extracting a word collection comprising one or more words from the code slice, and expanding the word collection with additional words. For example, if the word collection comprises the word "DB", the word "database" may be added. Additionally, the words may be split, for example a word containing an underscore, camel case (two or more connected words wherein the first letter of the second or further words is made uppercase) or another coding standard, may be split into two words. For example, first array or firstArray can be split into "first" and "array".

Storage device 112 may store word ranking and query phrasing module 132, for ranking the words in the word collection, and phrasing a corresponding query. For example, names of called functions may be assigned a higher rank than a variable name, loop indices may be assigned a low rank, etc. The query may comprise the collected words and optionally their ranks, such that higher ranked words are more important in matching code sections or other documents.

Storage device 112 may store code embedding module, for receiving a code section and embedding it within the user's code. The code section may replace some or all of the code slice of the user, the code slice of the user may be put in a comment, or the like. In some embodiments, the code section may be adapted to the user's code, for example variable names may be replaced to those used by the user, code lines may be added, required libraries may be imported, or the like.

Server 102 may comprise a processor 104, I/O device 108, communication device 110 as described above for user computing platform 100. Server 102 may comprise storage device 116 as described above for storage device 112 of user computing platform 100.

Storage device 116 of server 102 may store section or document obtaining module 140 for receiving a document, such as a web page retrieved from a programmers' forum, and optionally extracting one or more sections comprising code samples. In a non-limiting example, the code samples may relate to source or source component such as a function referred to in the page, for example in the page title, in a question, or the like. In some situations, the code samples may relate specifically to open source or open source component.

Storage device 116 may store section and document processing and ranking module 144 for processing each obtained section or document, including preprocessing the text, ranking words from the section or document, and ranking the section or document. The ranks of words may be based on the location of the word in the section or the page, for example a word in the title may be ranked higher than a rank in the code, whether words in the code are function names, variable names, or the like, the number of repetitions of a word in the code; the section or document length; or the like. Section or document ranking can be based on the ranks assigned to words or word combinations within the section or document, on one or more grades of the person who contributed the section or document, a grade given to the section or document by later users of the web page, estimation of the positive or negative sentiment expressed in users' comments, such as "great, thank you", "just what I needed", "there is a bug here", etc. Ranking can also take into account a rank of the site or the specific document or page the section or document is extracted from.

The sections and documents, corresponding ranks and optionally indexing data may be stored in source and document database 152, comprising at least one code section, such as an open source code section. Storage device 316 may store or be in communication with another storage device storing source and document database 152. It will be appreciated that source and document database 152 may be accessed by a multiplicity of servers 102, and/or one or more user computing platforms 100.

Storage device 116 may store database query engine 148 for receiving a user's query and retrieving one or more code sections or other documents or parts thereof corresponding to the query, for example documents or code sections whose match with the query exceeds a predetermined threshold, a predetermined number or percentage of sections having the highest threshold, or the like. The match between a query and a code section or document may be determined upon the title or content comprising as many as possible words from the query, and in particular words having high word rank. The match may be based on similarity between one or more words in the query and one or more words in the database. The sections or documents may be provided to the user or the IDE with a rank, based for example of the rank of the section and on the match rank between the query and the section.

It will be appreciated that database query engine 148 or parts thereof may be stored on storage device 112 of user computing platform 100. In such configuration, the parts of database query engine 148 may communicate via communication device 100 of user computing platform 100 and of server 102.

Referring now to FIG. 2, showing a flowchart of steps in a method for assisting a user such as a programmer in using open source, in accordance with some exemplary embodiments of the subject matter.

The method comprises an offline stage 200, which may be performed by server 102, for preparing, updating and maintaining source and document database 152, and online stage 204 for retrieving code sections and documents from the database for assisting a user in using open source.

Offline stage 200 can comprise accessing document collection on step 208. The document collection may be pre-defined, for example known sites containing questions, answers and code samples provided by programmers; forums; pages of open source providers that supply usage examples, papers, or the like. The collections may be accessed by crawling, accessing according to predetermined lists, or the like.

One or more of the pages may be sectioned on step 212 into sections, wherein at least one section comprises computer code. The computer code may be detected by searching for predetermined words such as "import", "for", or other words associated with a programming language, a pattern, or the like. It will be appreciated that a page may comprise multiple sections. For example, a page comprising a question may also comprise a multiplicity of answers, two or more of which may comprise code. Step 212 may be performed for each page accessed on step 208. It will be appreciated that a section is not limited to code section, and may also refer to a document, paper, or part thereof.

On step 216, a single section may be preprocessed, including for example extracting words, building a word bag, ranking each word in accordance with some ranking guidelines, the location of each word, e.g. in the title, a fiction name, in a comment, a variable name, or the like.

On step 220, the section may be ranked. Ranking can be based, for example on any one or more of the following factors: ranks assigned to words or word combinations within the section; correspondence between words in the section and a title of the page or text posted at a beginning of the page, which may be assumed to be a question that started a conversation; a grade given by one or more viewers of the section; a grade or popularity of the person who posted the section; number or percentage of comments in the section; length of the code in the section; or the like. It will be appreciated that further factors may also be used in ranking the section.

On step 224, the section may be stored in source and document database 152. The section may be stored with a title of the page it was found on, and/or with the assigned rank. The section may be indexed in accordance with the title or one or more words from the title, a name of a known source or open source unit used in the section, one or more words form the section, the author, or the like.

Steps 216, 220 and 224 may be repeated for every section of every received document.

Online stage 204 may be performed continuously, periodically every predetermined time, when a user is coding using an IDE and it is detected that the user is writing code attempting to use source or open source, or when the user invokes an assisting program.

Online step 204 can include accessing the user's code on step 232. The code may be accessed from within the IDE, or by another program. The code may be accessed at the location the user is entering code, file by file, class by class, only files or classes that have changed, or the like.

On step 236 one or more slices may be extracted from the user's code. A slice may be identified by the usage or attempted usage of external code, such as usage of Application Program Interface (API). The slice can be defined from the point at which the first attempt is recognized until the end of a block, a function, a file, a unit, or the like. In some embodiments, the code may be searched on an ongoing manner as the user types characters. In other embodiments, the full code may be searched on predetermined intervals, upon user request, or the like.

Once a code line indicating the possibility of source or open source usage has been detected, further related code lines may be considered to be part of the slice.

For example, it may be required to calculate a slice comprising the line "out.println("</table>")" in the user code below:

```
1    out.println("<table border=0>");
2    int start = page * 20;
3    int end = start + 20;
4    end = Math.min(end, album.getPictures( ).size( ));
5    for (int i = start; i < end; i++) {
6        Picture picture = album.getPicture(i);
7        printPicture(out, picture );
8    }
9    out.println("</table>");
```

Since the variable "out" is used in this line (9), a line in which it may have been changed is added, being line 7. A previous line where the variable may have been changed may then be added, being line 1. A line that defines or sets a value to the variable "picture" which also appears in line 7, being line 6 is also added. Lines 6 and 7 are within a loop, so lines 5 and 8 being the loop start and end are added. The lines containing definitions or setting values to the variables "start" and "stop" indicating the loop boundaries are also being added, being lines 2, 4 and 3.

Thus, a section is identified which comprises a call to an open source unit, and the code that surrounds and enables this call.

On step 240, words may be extracted from the slice. The words may include called functions or library names, variable names, significant words from one or more comments, or the like. In addition, contextual words may be added, such as programming language name, other entity names such as "database", abbreviations, synonyms, or the like.

On step 242 combined words may be split, for example a word containing an underscore, camel case, or another coding standard may be split into two or more words.

For example, given the following code lines:

```
import pymongo
try:
        client = pymongo.MongoClient( )
        ...
except pymongo.errors.ConnectionFailure, e:
    db = client[config.mongo__mydb( )]
    latest = db.images.find__one({'source': ....}, sort=??
```

The following words may be collected: sort, db, latest, client, pymongo, and mongodb. The words may be extracted using Abstract Syntax Tree (AST) techniques.

On step 244, the extracted word collection may be expanded with additional words which may be related, including for example known ontologies. For example, if the word collection includes "db", the word "database" may be added or vice versa, and similarly for "ID" and "identifier", "user" and "usr", or other synonyms and abbreviations. Thus, if a similar word appears in a section stored in source and document database 152, it may cause the section to be retrieved in response to the query.

On step 248 the words may be ranked. In some embodiments, the name of a called function or unit may be ranked high, while variable names may be ranked lower, and some words belonging to the programming language, for example "for" may be ranked further lower, or even omitted.

On step 252, a query may be issued to source and document database 152, comprising the words and respective ranks.

On step 256, the query may be processed, for example by database query engine 148. Processing may include retrieving documents or code sections from source and document database 152, which comprise one or more words from the words included in the query, and ranking the documents or code sections. The rank assigned to the match between a document or code section and the query may depend on the number of words from the query, with or without repetitions, included in the document, document title, section or the section title, the rank of these words, the rank assigned to each respective document or section and possibly additional factors. It will be appreciated that these factors, being the words, word number, the work rank and the section rank may be prioritized and integrated. A high rank may indicate a high match of the section to the query and hence to the code slice.

On step 260, a list of the returned sections and documents may be provided back to the user's computing platform, and optionally displayed to a user.

On step 264 one of the returned code sections and documents may be selected, either by a user or automatically, and the selected code section or document may be returned. In some embodiments, one code section or document may be selected by database query engine 148, such that only the selected section or document is provided to the user's computing platform.

On step 268, if the selection is of a code section, the selected code section may be embedded within the user code. Embedding may include changing variable names to adhere to the user's variable names or standard thereof. Embedding may also include commenting out the user's code slice, such that the user does not lose it and can keep using the code or parts thereof.

It is noted that the teachings of the presently disclosed subject matter are not bound by the computing platform described with reference to FIG. 1 or the method of FIG. 2. Equivalent and/or modified functionality can be consolidated or divided in another manner and can be implemented in any appropriate combination of software with firmware and/or hardware and executed on one or more suitable devices.

The apparatus can be a standalone entity, or integrated, fully or partly, with other entities, which can be directly connected thereto or via a network.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatus, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
accessing user computer code;
automatically extracting a slice from the user computer code indicating usage or usage attempt of external source code, the slice comprising a multiplicity of words;
subject to a word from the multiplicity of words being combined of at least two words, splitting the word to the at least two words;
assigning a word rank to at least one word from the multiplicity of words;
issuing a query based on the user computer code and comprising at least some of the multiplicity of words and the at least two words, to a source and document database;
receiving from the source and document database in response to the query, at least one source section related to usage of the external source code, wherein the at least one source section is retrieved in accordance with the word rank of the at least one word; and
embedding computer instructions from the at least one source section into the user computer code, said embedding comprising adapting the computer instructions to the user computer code.

2. The method of claim 1, wherein the at least one source section comprises open source code.

3. The method of claim 1, further comprising:
presenting to a user a list of the at least one source section or document; and
receiving a user selection of a source section or a document from the list of the at least one source section or document.

4. The method of claim 1, further comprising:
assigning a match rank to the at least one source section or document received, the match rank indicting a match between the at least one source section or document and the query; and
selecting a source section or document in accordance with the match rank.

5. The method of claim 1, further comprising preparing the source and document database, said preparing comprising:
accessing a collection of documents comprising source code;
for a document in the collection of documents:
extracting a section from the document;
assigning a rank to the section; and
storing the section or the document and the rank in the source and document database.

6. The method of claim 5, wherein the at least one section or document is stored in association with a title.

7. The method of claim 5 further comprising preprocessing the at least one document.

8. The method of claim 1, further comprising:
extracting words from the slice to create a word collection;
expanding the word collection with at least one word; and
phrasing the query based on the word collection.

9. The method of claim 1, wherein adapting the instructions to the user computer code comprises changing variable names, adding code lines or adding required libraries.

10. The method of claim 1, wherein the word being combined of the at least two words is identified by usage of camel case.

11. A computerized apparatus having a processor, the processor being configured to perform the steps of:

accessing user computer code;

automatically extracting a slice from the user computer code indicating usage or usage attempt of external source code, the slice comprising a multiplicity of words;

subject to a word from the multiplicity of words being combined of at least two words, splitting the word to the at least two words;

assigning a word rank to at least one word from the multiplicity of words;

issuing a query based on the user computer code and comprising at least some of the multiplicity of words and the at least two words, to a source and document database;

receiving from the source and document database in response to the query, at least one source section related to usage of the external source code, wherein the at least one source section is retrieved in accordance with the word rank; and embedding computer instructions from the at least one source section into the user computer code, said embedding comprising adapting at least one of the computer instructions to the user computer code.

12. The apparatus of claim 11, wherein the at least one source section comprises open source code.

13. The apparatus of claim 11, wherein the processor is further configured to:
present to a user a list of the at least one source section or document; and
receive a user selection of a section or a document from the list of the at least one source section or document.

14. The apparatus of claim 11, wherein the processor is further configured to:
assign a match rank to at least one of the source sections received, the match rank indicting a match between the at least one source section or document and the query; and
select a section or document in accordance with the match rank.

15. The apparatus of claim 11, wherein the processor is further configured to prepare the source and document database, comprising:
accessing a collection of documents comprising source code;
for a document in the collection of documents:
extracting a section from the document;
assigning a rank to the section; and
storing the section or the document and the rank in the source and document database.

16. The apparatus of claim 15 wherein the processor is further configured to preprocess the section or document.

17. The apparatus of claim 11, wherein the processor is further configured to:
extract words from the slice to create a word collection;
expand the word collection with at least one word; and
phrase the query based on the word collection.

18. The apparatus of claim 11, wherein adapting the instructions to the user computer code comprises changing variable names, adding code lines or adding required libraries.

19. The apparatus of claim 11, wherein the word being combined of the at least two words is identified by usage of camel case.

20. A computer program product comprising a computer readable storage medium retaining program instructions, which program instructions when read by a processor, cause the processor to perform a method comprising:
accessing user computer code;
automatically extracting a slice from the user computer code indicating usage or usage attempt of external source code, the slice comprising a multiplicity of words;
subject to a word from the multiplicity of words being combined of at least two words, splitting the word to the at least two words;
assigning a word rank to at least one word from the multiplicity of words;
issuing a query based on the user computer code and comprising at least some of the multiplicity of words and the at least two words, to a source and document database;
receiving from the source and document database in response to the query, at least one source section related to usage of the external source code, wherein the at least one source section is retrieved in accordance with the word rank; and
embedding computer instructions from the at least one source section into the user computer code, said embedding comprising adapting the computer instructions to the user computer code.

\* \* \* \* \*